United States Patent
Yang

(10) Patent No.: US 9,817,775 B2
(45) Date of Patent: Nov. 14, 2017

(54) CONTROL SYSTEM FOR HARD DISK

(71) Applicant: MiiCs & Partners (Shenzhen) Co., Ltd., Shenzhen (CN)

(72) Inventor: Meng-Liang Yang, Shenzhen (CN)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 129 days.

(21) Appl. No.: 14/809,407

(22) Filed: Jul. 27, 2015

(65) Prior Publication Data

US 2017/0031849 A1 Feb. 2, 2017

(51) Int. Cl.
*G06F 13/00* (2006.01)
*G06F 13/20* (2006.01)
*G06F 9/445* (2006.01)

(52) U.S. Cl.
CPC .......... *G06F 13/20* (2013.01); *G06F 9/44505* (2013.01)

(58) Field of Classification Search
CPC .............................. G06F 13/20; G06F 9/44505
See application file for complete search history.

(56) References Cited

U.S. PATENT DOCUMENTS 7,474,926 B1 *  1/2009  Carr ..................... G06F 1/266
                                            700/19
8,296,513 B1 * 10/2012  Liu ...................... G06F 1/3268
                                            360/69

2010/0290149 A1 * 11/2010  Ahmad .................. G11B 21/12
                                            360/71
2013/0050929 A1 *  2/2013  Yin ........................ H01R 29/00
                                            361/679.33
2014/0313611 A1 * 10/2014  Tian .................... G11B 19/2054
                                            360/73.03

OTHER PUBLICATIONS

"Serial ATA Advanced Host Controller Interface (AHCI)" Revision 1.31, Intel, 2014.*
"JMB393 Port Multiplier Chip", JMicron Inc. @2008.*
"Powering the boards and accessories", Retrieved form http://linux-sunxi.org/Powering_the_boards_and_accessories, Dec. 2016.*

* cited by examiner

*Primary Examiner* — Jing-Yih Shyu
(74) *Attorney, Agent, or Firm* — Steven Reiss

(57) ABSTRACT

A control system for a plurality of hard disks includes a chip unit, a first storage unit, and a second storage unit. The chip unit includes a first, second, and third GPIO pin and a firmware. The first storage unit is coupled to the chip unit and a plurality of hard disks. The second storage unit is coupled to the chip unit and a plurality of hard disks. When the first GPIO of the chip unit receives a power on signal, the firmware carries out a staggered spin-up function, the second GPIO of the chip unit outputs a first signal to the first storage unit, the hard disks of the first storage unit execute spin up, after a preset delay time, the third GPIO of the chip unit outputs a second signal to the second storage unit, and the hard disks of the second storage unit execute spin up.

4 Claims, 1 Drawing Sheet

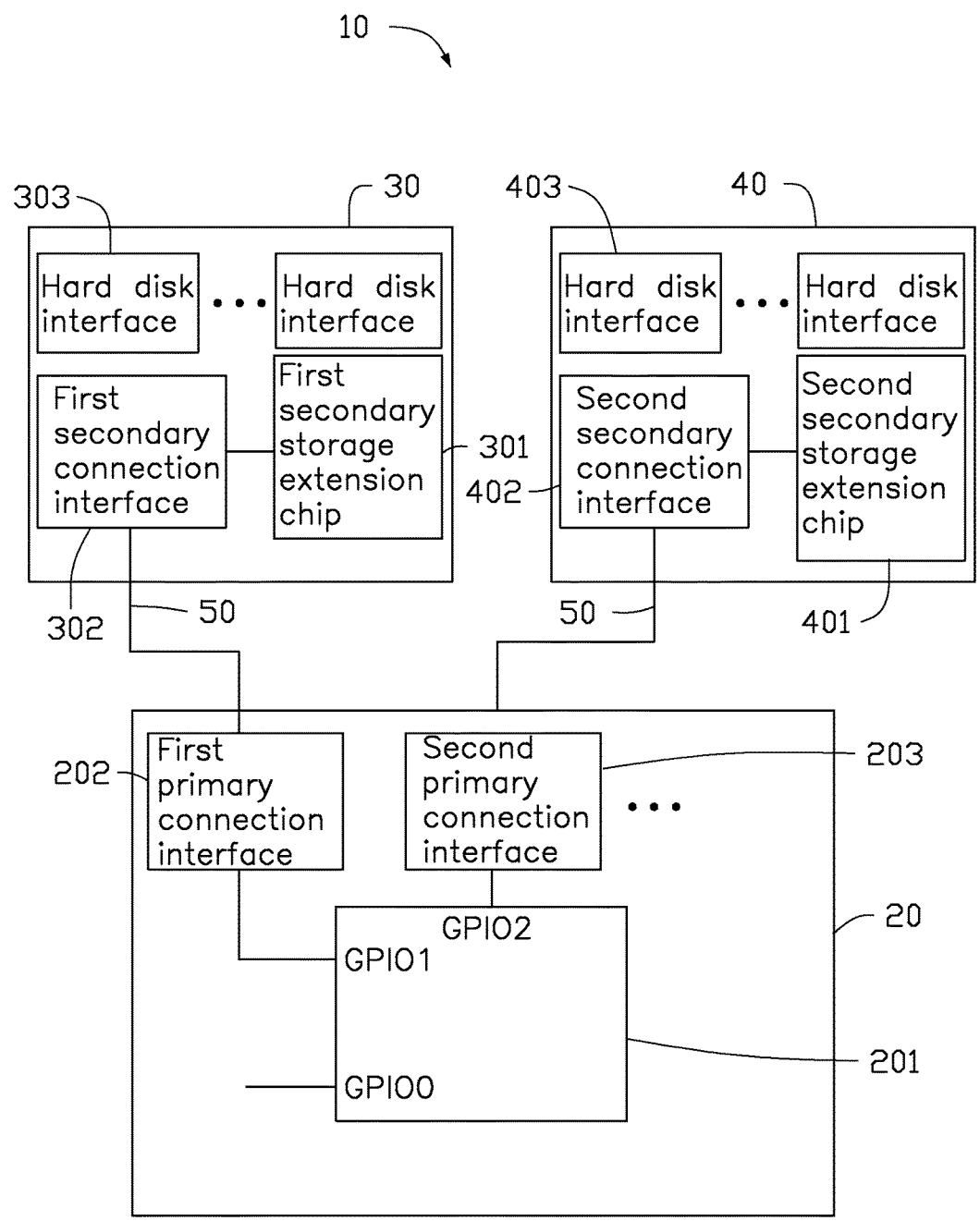

CONTROL SYSTEM FOR HARD DISK

FIELD

The subject matter herein generally relates to a control system for a plurality of hard disks.

BACKGROUND

A hard disk can be configured to store information. In some arrangements, a hard disk can be configured to cooperate with one or more other hard disks. A just a bunch of disks (JBOD) system usually includes one level or a multilevel extended chips to control a plurality of hard disks. The JBOD can include a power supply that provides current at the time of powering the JBOD so that the hard disks spin. When the hard disk drives execute spin up at the time of powering on, current of a power supply can experience a surge.

BRIEF DESCRIPTION OF THE DRAWINGS

Implementations of the present technology will now be described, by way of example only, with reference to the attached figures.

The FIGURE is a block diagram of an example embodiment of a control system for hard disks.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure is described in relation to a control system for hard disks.

The FIGURE illustrates an example embodiment of a control system 10. The control system 10 can comprise a chip unit 20, a first storage unit 30, a second storage unit 40, and a connection line 50. The first storage unit 30 and the second storage unit 40 are electrically coupled to the chip unit 20 through the connection line 50.

The chip unit 20 can comprise a primary storage extension chip 201, a first primary connection interface 202, and a second primary connection interface 203. The primary storage extension chip 201 includes three general purpose input/output (GPIO) pins GPIO0, GPIO1, GPIO2, and a firmware (FW). The GPIO0 is configured to receive a power on signal from a power supply (not shown). The firmware is configured to carry out a staggered spin-up function. In the embodiment, the staggered spin-up function is carried out by the firmware when the GPIO0 receives the power on signal. The staggered spin-up function is not carried out by the firmware when the GPIO0 does not receive the power on signal. The staggered spin-up function is configured to boot the first and second storage units 30, 40 sequentially.

The GPIO1 is electrically coupled to the first primary connection interface 202. The GPIO2 is electrically coupled to the second primary connection interface 203. The GPIO1 is configured to generate and output a first signal to the first storage unit 30 through the connection line 50. The GPIO2 is configured to generate and output a second signal to the second storage unit 40 through the connection line 50. In the embodiment, the GPIO1 generates a high level signal as the first signal when the firmware carries out the staggered spin-up function, and generates a low level signal as the first signal when the firmware does not carry out the staggered spin-up function. The GPIO2 generates the high level signal as the second signal when the firmware carries out the staggered spin-up function, and generates the low level signal as the second signal when the firmware does not carry out the staggered spin-up function.

Each of the first and second storage units 30, 40 is a backboard and is configured to electrically couple to a plurality of hard disks. The first storage unit 30 comprises a first secondary storage extension chip 301, a first secondary connection interface 302 electrically coupled to the first secondary storage extension chip 301, and a plurality of hard disk interfaces 303. The second storage unit 40 comprises a second secondary storage extension chip 401, a second secondary connection interface 402 electrically coupled to the second secondary storage extension chip 401, and a plurality of hard disk interfaces 403. The first secondary connection interface 302 is electrically coupled to the first primary connection interface 202 of the chip unit 20 through the connection line 50. The second secondary connection interface 402 is electrically coupled to the second primary connection interface 203 of the chip unit 20 through the connection line 50. Each of the hard disk interfaces 303 and the hard disk interfaces 403 are electrically coupled to a corresponding hard disk.

When powering on, the GPIO0 of the primary storage extension chip 201 receives the power on signal, and the firmware carries out the staggered spin-up function. The GPIO1 of the primary storage extension chip 201 outputs the high level signal, such as logic "1", to the first secondary storage extension chip 301 of the first storage unit 30 through the connection line 50, and the hard disks of the first storage unit 30 execute spin up. After a preset delay time, such as 10 seconds, the GPIO2 of the primary storage extension chip 201 outputs the high level signal, such as logic "1", to the second secondary storage extension chip 401 of the second storage unit 40 through the connection line 50, and the hard disks of the second storage unit 40 execute spin up.

When powering off, the GPIO0 of the primary storage extension chip 201 does not receive the power on signal, and the firmware does not carry out the staggered spin-up function. The GPIO1 and GPIO2 of the primary storage extension chip 201 output the low level signals, such as logic "0", to the first and second secondary storage extension chips 301, 401 through the connection line 50, and the hard disks of the first and second storage units 30, 40 do not execute spin up.

Therefore, when the first to second storage units 30, 40 can be booted sequentially, through the primary storage extension chip 201 and the firmware, avoids a risk of over-current, if the first to second storage units 30, 40 are boot synchronously.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A control system for a plurality of hard disks, the control system comprising:
   a chip unit comprising a primary storage extension chip comprising a first, second, and third general purpose input/output (GPIO) pin and a firmware, wherein the first GPIO is configured to receive a power on signal, the second GPIO is configured to output a first signal, the third GPIO is configured to output a second signal, the firmware is configured to carry out a staggered spin-up function, wherein the first signal is a high level signal, and the second signal is a high level signal; wherein the chip unit further comprises a first primary connection interface and a second primary connection interface, wherein the first primary connection interface is electrically coupled to the second GPIO, and the second primary connection interface is electrically coupled to the third GPIO;
   a first storage unit comprising a first secondary storage extension chip electrically coupled to the chip unit and a plurality of hard disks; and
   a second storage unit comprising a second secondary storage extension chip electrically coupled to the chip unit and a plurality of hard disks;
   when the first GPIO of the primary storage extension chip receives the power on signal, the firmware carries out the staggered spin-up function, the second GPIO of the primary storage extension chip outputs the first signal to the first secondary storage extension chip of the first storage unit, the hard disks of the first storage unit execute spin up, after a preset delay time, the third GPIO of the primary storage extension chip outputs the second signal to the second secondary storage extension chip of the second storage unit, and the hard disks of the second storage unit execute spin up.

2. The control system of claim 1, wherein the first storage unit further comprises a first secondary connection interface, and a plurality of hard disk interfaces, wherein the first secondary connection interface is electrically coupled to the first primary connection interface of the chip unit, and the plurality of hard disk interfaces is electrically coupled to corresponding hard disks.

3. The control system of claim 2, wherein the second storage unit further comprises a second secondary connection interface, and a plurality of hard disk interfaces, wherein the second secondary connection interface is electrically coupled to the second primary connection interface of the chip unit, and the plurality of hard disk interfaces is electrically coupled to corresponding hard disks.

4. The control system of claim 3, further comprising a connection line, wherein the first storage unit and the second storage unit are electrically coupled to the chip unit through the connection line.

* * * * *